United States Patent
McWilliams

Patent Number: 5,201,784
Date of Patent: Apr. 13, 1993

[54] SPINNER BAIT FISHING LURE

[76] Inventor: Arthur D. McWilliams, 6901 Ogden St., Omaha, Nebr. 68104

[21] Appl. No.: 930,807

[22] Filed: Aug. 17, 1992

[51] Int. Cl.⁵ .............................................. A01K 85/00
[52] U.S. Cl. ................................... 43/42.31; 43/42.11; 43/42.13
[58] Field of Search ................. 43/42.31, 42.11, 42.13, 43/42.39, 4.5

[56] References Cited

U.S. PATENT DOCUMENTS

| | | | |
|---|---|---|---|
| 3,987,576 | 10/1976 | Strader | 43/42.31 |
| 4,619,068 | 10/1986 | Wotawa | 43/42.31 |
| 4,745,700 | 5/1988 | Paris | 43/42.31 |
| 4,793,089 | 12/1988 | Long | 43/42.31 |
| 4,930,247 | 6/1990 | Dubois | 43/42.31 |
| 5,001,856 | 3/1991 | Gentry | 43/42.31 |
| 5,024,019 | 6/1991 | Rust et al. | 43/42.31 |
| 5,035,075 | 7/1991 | Pearce | 43/26.2 |
| 5,050,334 | 9/1991 | Standish, Jr. | 43/42.13 |

Primary Examiner—Kurt C. Rowan
Attorney, Agent, or Firm—John A. Beehner

[57] ABSTRACT

The apparatus of the present invention comprises a spinner bait fishing lure having a spinner, a slidably mounted carriage, and a generally conical shaped water diverting member adapted to receive the carriage therein. A rattle is pivotally mounted within the carriage such that upon rotation of the spinner, the carriage is reciprocated side to side causing the rattle to strike the carriage emitting sounds therefrom. The method of the invention includes providing a spinner bait fishing lure having a carriage and rattle therein, attaching the spinner bait to the fishing line; casting the lure into fish infested water; and pulling the lure through the water by reeling in the line causing the rattle to strike the carriage, thereby emitting sounds therefrom.

7 Claims, 2 Drawing Sheets

SPINNER BAIT FISHING LURE

BACKGROUND OF THE INVENTION

1. Technical Field

The apparatus and method and method of the present invention relate generally to an improved spinner bait fishing lure. More specifically, they relate to an apparatus and method for attracting variety of fish species in a variety of water conditions.

Spinner type fishing lures have been popular for many years. Generally, a spinner lure includes a body comprising a single length of wire having a bend generally in the middle thereof. On one end of the wire is attached a hook and lead weight and on the other end of the wire a spinner is attached thereto by means of a swivel. The lure is attached to the fishing align at approximately the position of the bend in the wire. Drawing the lure through the water by conventional fishing tackle causes the lure to spin thereby attracting fish.

The apparatus and method of the present invention improve on the prior art spinner fishing lures by adding a rattle noise making device. Thus, fish are attracted not only visually by the spinner apparatus, but additionally by the sounds emitted from the rattle.

2. Description of the Prior Art

The supply of fishing lures is virtually limitless. They come in all sizes, shapes and colors. Sophistication among the lures varies greatly ranging from a simple hook and sinker to sophisticated spinner arrangements, all designed to attract fish in their own way.

One theory holds that different types of fish are attracted by different colors. Therefore, numerous lures utilize different, and sometimes quite exotic, colors, depending on the type of fish desired to be attracted. Still another theory holds that fish are attracted by bright or shinny objects. Consequently, numerous lures incorporate various configurations designed to reflect sunlight and catch the fish's attention. Still another theory holds that fish are attracted by sound. Numerous lures have been designed to incorporate parts which make a sound when the lure is pulled through the water.

One example of a prior art lure incorporating several of the above mentioned features is a spinner lure having a single piece of wire with a bend approximately in the middle thereof, thereby forming two arms. On one arm is located the hook. Attached to the top thereof is a lead head with a figure painted thereon and serving as a weight for the lure. Also attached to the head is a plastic skirt serving to both give the lure a bright appearance and as a weed guard for the hook. On the end of the other arm is attached a swivel and a spinner. The spinner being a generally concave, lenticular piece of metal which serves to reflect sunlight therefrom. The swivel connection on the end of the arm allows the spinner to spin when the lure is pulled through the water. Thus, the lure attracts fish by incorporating several of the above mentioned theories including bright colors and a shiny reflection.

In some of the midwestern states, however, where the water is not very clear, the shiny reflection or bright colors of the lure are ineffective to attract attention of the fish since they are unable to see them. Therefore, in such bodies of water, the only effective method to attract fish is to use the sensitivity of the fish to sound waves. It has previously been observed that fish are attracted to acoustic vibrations in the water.

Another series of prior art lures attempts to attract fish by incorporating the theory that fish are attracted by noise. This has been done in several methods. Including placing rattles in the head of the lure or connecting rattles to the blade which then hits the blade when as it spins.

Several prior art devices have incorporated the notion that fish are attracted by sound. The majority of these prior art devices utilize a container filled with shot which, when the lure is drawn through the water, causes the container to rattle and the shot to strike the walls thereof. For example, Gentry, U.S. Pat. No. 5,001,856, describes a fishing lure having a rattling device comprising an elongated capsule of synthetic resin material containing noise-makers. The device may be used on either a jig-type or spinner type lure. Another example of a prior art device utilizing loose shot is Rust et al., U.S. Pat. No. 5,024,019, which describes a spinner bait lure having various rattle pod configurations containing loose shot wherein the rattle pod is mounted on the body segment of the wire harness extending between the lure body and the line eye. Another example of this prior art device is Dubois, U.S. Pat. No. 4,930,247, which is a spinner-type fishing lure having a metal spinner blade with a built-in rattle chamber and metal pellets in the chamber. When the lure is drawn through the water, the spinner rotates causing the metal pellets in the chamber to rattle. A final prior art device is Standish, U.S. Pat. No. 5,050,334, which is a sound producing fishing lure having an elongated body secured to a hook and a pair of bendable arms, each of the arms rotatably supporting spinners that intermittently hit each other when the lure drawn through the water. However, none of these prior art lures contain the unique combination of features defined by the present invention having a simplified, more effective, noise-making capability.

Therefore, it is a prime objective of the present invention to provide an apparatus which is capable of attracting fish in a variety of water conditions.

Another object of the present invention is to provide a fishing lure apparatus which is capable of attracting fish based on their sensitivity to sound.

Still another objective of the present invention is to provide a fish lure apparatus which is capable of attracting fish based on their visual sensitivity.

Yet another object of the present invention is to provide a fishing lure which is capable of being used with existing fishing rods and lines.

Yet another objective of the present invention is to provide a fishing lure which is easily adaptable by the fisherman into his current inventory of lures.

Another objective of the present invention is to provide a fishing lure with these features and which is less susceptible to being snagged on weeds or other underwater structures.

Finally it is a object of the present invention to provide a fishing lure which is sturdy, yet light weight and easy to manufacture.

SUMMARY OF THE INVENTION

The present invention is directed to a fishing lure apparatus and method for attracting fish both visually and audibly.

The apparatus of the present invention comprises a spinner bait fishing lure with an elongated member having two ends and a bend therebetween, forming a shaft portion and an arm portion. A hook is attached to the shaft portion end and a spinner is rotatably attached to the arm portion end. A carriage having a body and two walls is slidably attached to the arm, the walls extending outwardly and downwardly from the body. A generally conical shaped member having a hole therethrough is slidably mounted on the arm between the bend and the carriage, and is adapted to receive the carriage therein. A rattle pivotally mounted on the arm and within the carriage body such that upon rotation of the spinner, the arm and the carriage are reciprocated side to side causing the rattle to strike the walls emitting sounds therefrom.

Additionally, the invention includes a novel method of attracting fish. The method comprises; providing a spinner bait fishing lure for attachment to a standard fishing line having a carriage body and two walls attached thereto and extending outwardly and downwardly therefrom is slidably mounted on the lure, a generally conical shaped member having a hole therethrough is slidably mounted ahead of the carriage, and is adapted to receive the carriage therein. And a rattle is pivotally mounted on the arm and within the carriage such that upon rotation of the spinner, the arm and the carriage are reciprocated side to side causing the rattle to strike the walls emitting sounds therefrom. The spinner bait is attached to the fishing line and cast into fish infested water. The lure is then drawn through the water by reeling in the line.

The invention thus provides great advantages over the prior art by allowing the fishermen to fish for a variety of different fish species, attracting them based on a variety of different methods. Another advantage is that the lure allows fishermen to fish in a variety of different water visibilities by incorporating several different methods of attracting the fish.

DESCRIPTION OF THE PREFERRED EMBODIMENT

Figure 1:
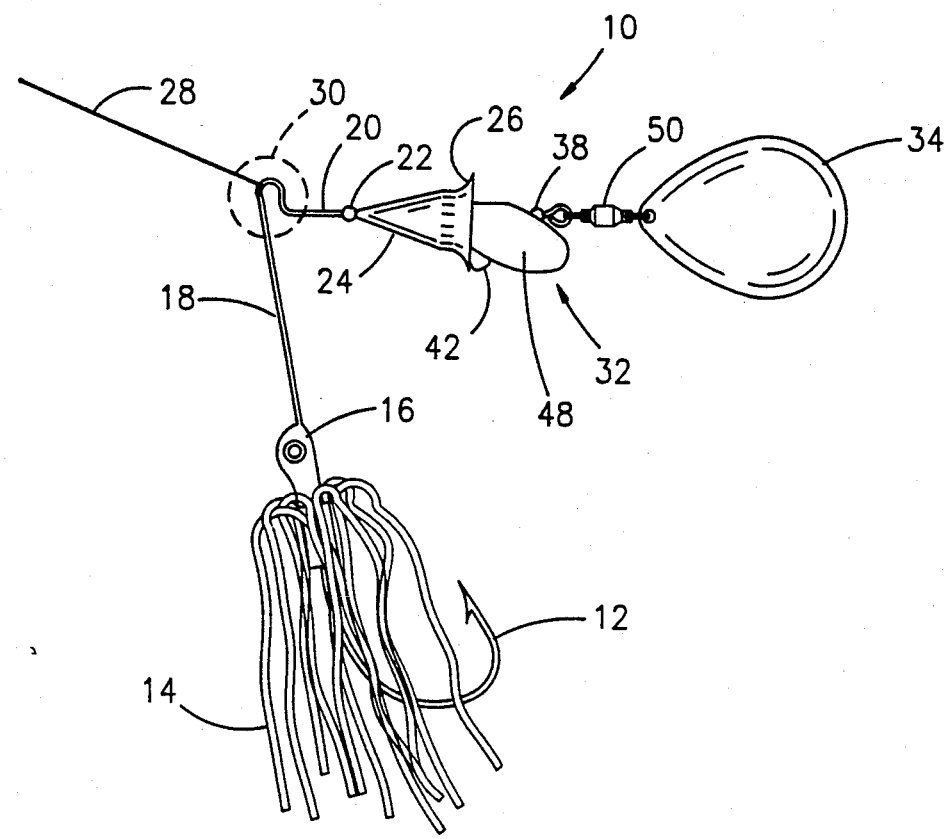
FIG. 1 is a side view of the apparatus showing major components thereof.

The fishing lure invention 10 of the present invention is best shown in FIG. 1. As shown in the invention 10 is formed by bending a piece of wire in approximately the center thereof, thereby forming a shaft 18 and an arm 20. The bend 30 in the wire is generally "R" shaped such that if the fish line 28 becomes wrapped around either the shaft 18 or the arm 20, the line 29 is urged back into proper position in the bend 30. Head 16 is attached at the end of shaft 18 and is used both as a weight for the lure 10 and to provide attachment means for hook 12. The head 16 is generally painted with a bright color to enable attraction of fish. In the preferred embodiment, the head 16 will be formed of lead or other similar material. Also attached to head 16 is skirt 14 also being generally bright color and serving additional function of protecting hook 12 from undesired engagement with weeds, tree branches or other subsurface structures. In the preferred embodiment, skirt 14 is constructed of a flexible material such as plastic, rubber or the like.

The heart of the invention 10 is the carriage 32, rattle 42, and water deflecting cone 24 all shown in FIG. 1. Cone 24 is slidably engaged with arm 20 by means of a hole therethrough. Additionally, a spherical spacing member 22 is also slidably engaged with arm 20 and forward of cone 24 providing for free movement of cone 24 should the cone 24 slide forward. In the preferred embodiment, the spherical spacing member 22 is a bb or similar material. Carriage 32 is also slidably attached to arm 20 by means of body 46 (FIG. 4) having holes therethrough and through which arm 20 may be slidably received, such that carriage 32 may slide forward and into cone 24. Carriage 32 further comprises two walls 36 and 48 (FIGS. 1 and 4) attached along its edge to body 46 and depending downward and outward therefrom. Rattle 42 is pivotally mounted on arm 20 and within carriage 32 by means of eyelet member 44 (FIG. 2 and 4) such that back and forth movement of lure 10 causes rattle 42 to strike walls 36 and 48 of carriage 32 thereby emitting a sound. In the preferred embodiment, rattle body, 42 and carriage walls 36 and 48 will be constructed of some metal material to produce sound when struck. Spherical spacing member 38 is slidably engaged with arm 20 and rearward of carriage 32 such that carriage 32 is freely able to rotate about arm 20. Spinner 34 is attached to arm 20 by means of swivel 50 thereby allowing spinner 34 to rotate and move freely about arm 20.

Also shown in FIG. 1 is retrieved cone 24. Cone 24 serves several functions. First, it serves as a weed guard for the carriage/rattle assembly, preventing the assembly from being snagged on any weeds, branches or other subsurface obstructions. Second, when the lure is retrieved through the water, cone 24 causes carriage 32 to be drawn into the rear of the cone 24. This serves to amplify the sounds produced by the rattle when it strikes walls 36 and 48 of carriage 32. Finally, cone 24 prevents carriage 32 from spinning when the lure is retrieved, thereby presenting a stable surface for the rattle to strike. Flange 26 on cone 24 allows maximum deflection of water around carriage 32 without extending the length of cone 24.

Figure 2:
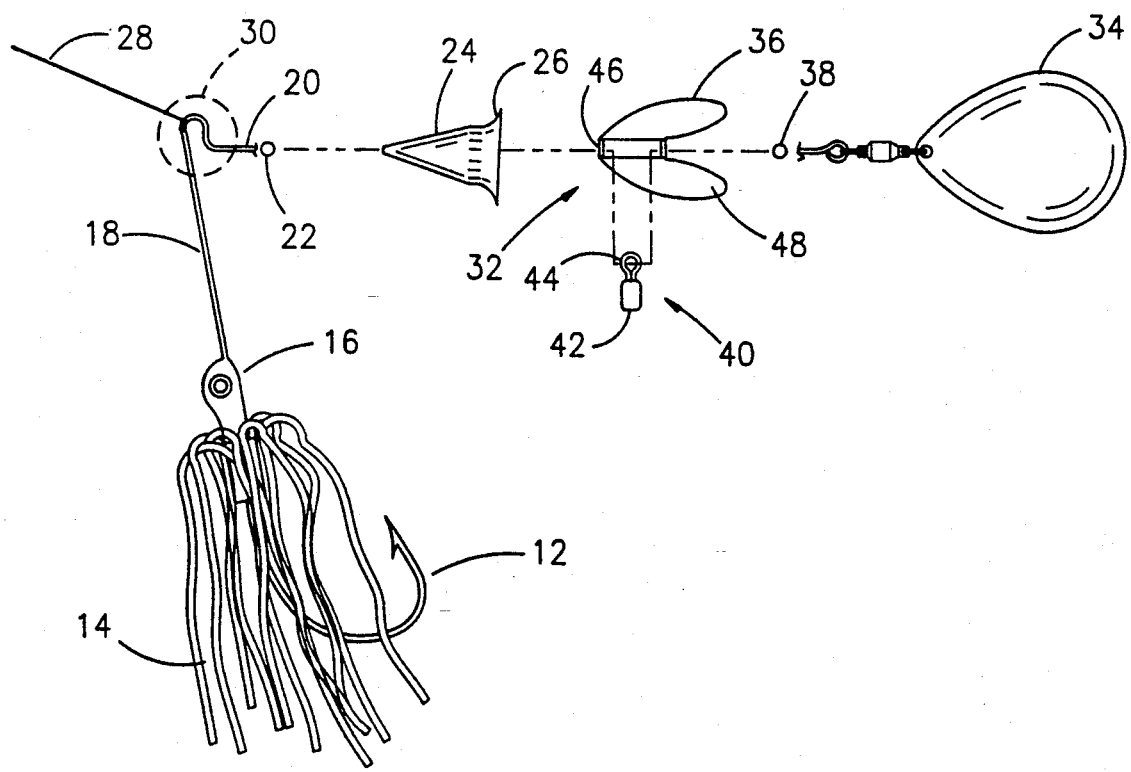
FIG. 2 is a side, exploded view showing the interconnection of the raffle.

FIG. 2 shows an exploded view of the sound generating components of the invention. Specifically, carriage 32 is shown comprising a body 46 and two walls 36 and 48 depending therefrom. Body 46 comprises holes (FIG. 4) allowing arm 20 to pass therethrough. Rattle 40 comprises body 42 and eyelet member 44. Eyelet 44 is slidably engaged with arm 20 and within carriage body 46 such that rattle body 42 will strike carriage walls 36 when the rattle 40 is pivoted back and forth on arm 20 due to movement of spinner 34 when the lure is drawn through the water. Also shown in FIG. 2 are spherical spacer members 22 and 38 which allow water displacement cone 24 and carriage 32 to move along, and rotatably about, arm 20.

Figure 3:
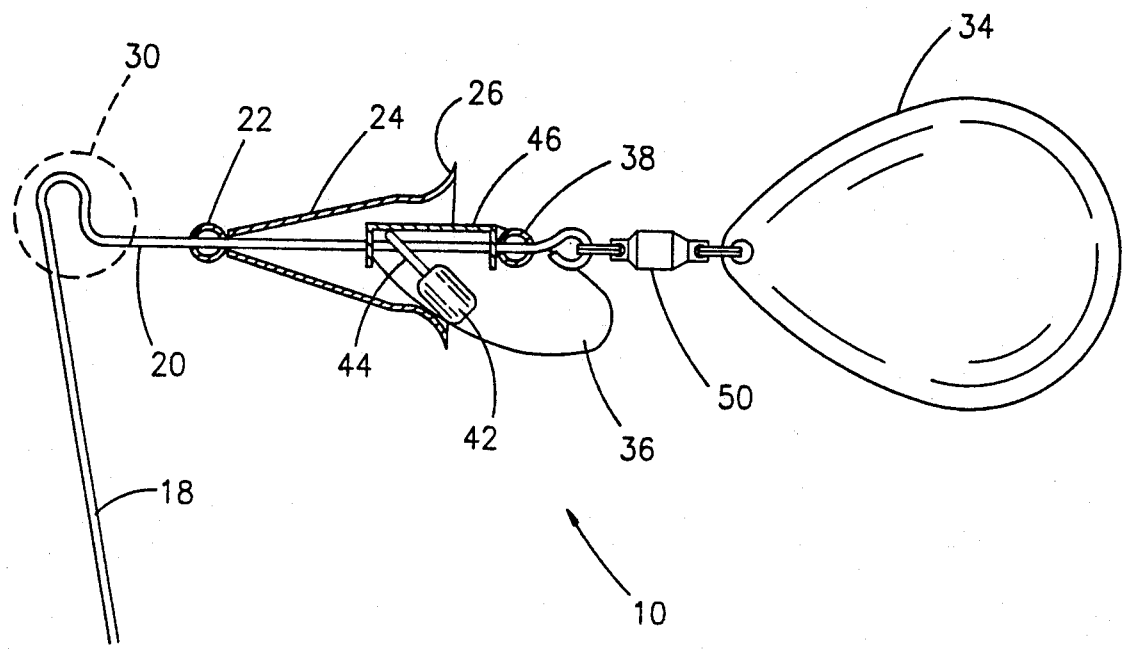
FIG. 3 is a side cross-sectional view of the cone and carriage and the attachment of the raffle therein.

Further details of the positioning relationship of the sound generating components of the apparatus are shown in FIG. 3. As can be seen in the figure, rattle body 42 is slidably engaged with arm 20 by means of eyelet member 44. The rattle 40 is mounted with the confines of carriage body 46 such that rattle body 42 will strike carriage walls 46 whenever rattled body 42 is moved side to side. Also shown in FIG. 3 is the capability for cone 24 to slidably receive carriage 32 in the rear portion thereof. Thus, when lure 10 is drawn through the water, water deflection cone 24 is able to deflect water away from carriage 32 thereby allowing free reciprocating movement of rattle 40 within carriage 32. As mentioned above, when rattle 40 is reciprocally moved side to side, rattle body 42 strikes walls 36 and 48 thereby emitting sound therefrom. Side to side reciprocating movement of rattle 40 is caused in part by movement of spinner 34 as lure 10 is drawn through the water. Free movement of spinner 34 is facilitated by swivel means 50 connecting spinner 34 with arm 20. Also shown in the figure are spherical spacer members 22 and 38 which allow free sliding and rotation of cone 24 and carriage 32 respectively, about arm 20.

Figure 4:
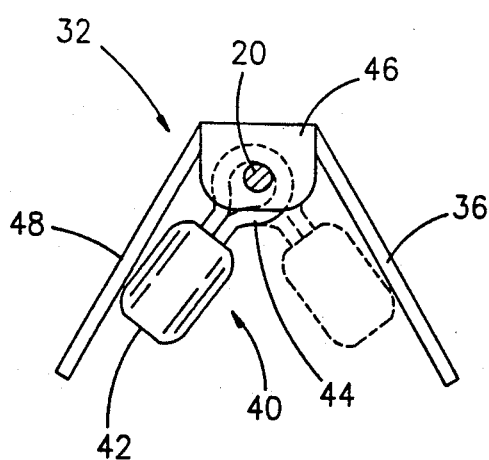
FIG. 4 is a rear view of the carriage and the raffle attached thereto and showing the reciprocating side to side movement thereof reciprocating.

FIG. 4 shows details of the interconnection of the carriage 32, the rattle 40 and arm 20. As seen in the figure, carriage body 46 comprises holes therethrough for slidably engaging arm 20. Rattle 40 is slidably engaged with arm 20 by means of eyelet member 44. Rattle 40 is mounted within carriage 32 such that side to side movement of rattle 42 as shown in the figure, causes rattle body 42 to strike carriage walls 36 and 48 thereby emitting sound therefrom.

Figure 5:
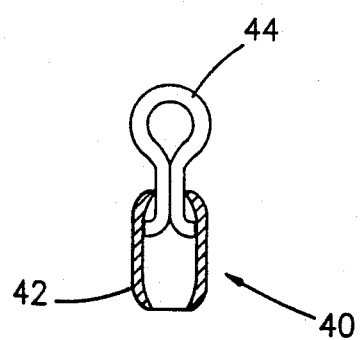
FIG. 5 is a cross-sectional end view of the rattle.

FIG. 5 shows details of rattle 40 including body 42 and eyelet member 44. In the preferred embodiment, body 42 will be constructed of metal or some similar material such that physical contact with carriage walls 36 and 48 (not shown) will cause sound to be emitted therefrom. Eyelet member 44 will be a wire member adapted to slidably engage arm 20 (not shown).

I claim:

1. A spinner bait fishing lure comprising:
    an elongated member having two ends and a bend therebetween, forming a shaft portion and an arm portion;
    a hook attached to said shaft portion end;
    a spinner rotatably attached to said arm portion end;
    a carriage having a body and two walls attached thereto and extending outwardly and downwardly therefrom and being slidably mounted on said arm portion, between said spinner and said bend;
    a generally conical shaped water diverting member having a hole therethrough and adapted to be slidably mounted on said arm between said bend and said carriage, and adapted to receive said carriage therein; and
    a rattle pivotally mounted on said arm and within said carriage such that upon rotation of said spinner, said arm and said carriage are reciprocated side to side causing said rattle to strike said walls emitting sounds therefrom.

2. In a spinner bait fishing lure having an elongated member with two ends and a bend therebetween, forming a shaft portion and an arm portion, a hook attached to the shaft portion end, a skirt attached to the hook, and a spinner rotatably attached to the arm portion end, wherein the improvement comprising,
    a carriage having a body and two walls attached thereto and extending outwardly downwardly therefrom and being slidably mounted on said arm portion, between said spinner and said bend;
    a generally conical shaped water diverting member having a hole therethrough and adapted to be slidably mounted on said arm between said bend and said carriage, and adapted to receive said carriage therein such that water is deflected by said conical shaped member and away from said carriage; and
    a rattle being pivotally mounted on said arm and within said carriage such that pulling of said lure through the water causes rotation of said spinner which effects a reciprocal side to side movement of said arm and carriage causing said rattle to strike said walls emitting sounds therefrom.

3. The invention of claim 2 wherein said conical shaped member further comprises a flared flange at the open end thereof adapted to further deflect water away from said carriage and rattles and to reduce engagement of said carriage with and subsurface obstacles.

4. The invention of claim 3 further comprising a generally spherical member having a hole therethrough, slidably mounted on said arm at the tapered end of said conical shaped member and a generally spherical member having a hole therethrough, slidably mounted on said arm between said carriage and said spinner, said spherical members adapted to facilitate the rotational movement of said carriage and said conical shaped member about said arm.

5. The invention of claim 4 wherein each wall comprises a generally wing shaped member extending downwardly, outwardly and rearwardly from said body.

6. The invention of claim 5 wherein said wing shaped member comprises a generally flat plate of substantially uniform thickness and having a width which tapers rearwardly.

7. A method of attracting fish with a spinner bait fishing lure comprising:
    providing a spinner bait fishing lure for attachment to a standard fishing line, said lure having an elongated member having two ends and a bend therebetween, forming a shaft portion and an arm portion; a hook attached to said shaft portion end; a spinner rotatably attached to said arm portion end; a carriage having a body and two walls attached thereto and extending outwardly and downwardly therefrom and being slidably mounted on said arm portion, between said spinner and said bend; a generally conical shaped member having a hole therethrough and adapted to be slidably mounted on said arm between said bend and said carriage, and adapted to receive said carriage therein; and a rattle pivotally mounted on said arm and within said carriage;
    attaching said spinner bait to said fishing line;
    casting said lure into fish infested water; and
    pulling said lure through the water by reeling in said line causing said spinner to rotate, causing said arm and said carriage to be reciprocated side to side causing said rattle to strike said walls emitting sounds therefrom.

* * * * *